United States Patent
Weiberle et al.

(10) Patent No.: US 7,886,191 B2
(45) Date of Patent: Feb. 8, 2011

(54) METHOD FOR REBOOTING A SIGNAL PROCESSING SYSTEM

(75) Inventors: Reinhard Weiberle, Vaihingen/Enz (DE); Bernd Mueller, Gerlingen (DE); Yorck Von Collani, Beilstein (DE); Rainer Gmehlich, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 552 days.

(21) Appl. No.: 11/973,149

(22) Filed: Oct. 5, 2007

(65) Prior Publication Data

US 2008/0109648 A1  May 8, 2008

(30) Foreign Application Priority Data

Oct. 10, 2006  (DE) .................. 10 2006 048 171

(51) Int. Cl.
*G06F 11/00* (2006.01)

(52) U.S. Cl. .......................................... 714/36; 714/48
(58) Field of Classification Search .................. 714/47, 714/48, 1, 36
See application file for complete search history.

(56) References Cited

U.S. PATENT DOCUMENTS

| 6,601,165 | B2 * | 7/2003 | Morrison et al. ............... 713/2 |
| 7,134,046 | B2 * | 11/2006 | Rathunde et al. .............. 714/10 |
| 2004/0199811 | A1 * | 10/2004 | Rathunde et al. .............. 714/10 |

* cited by examiner

*Primary Examiner*—Dieu-Minh Le
(74) *Attorney, Agent, or Firm*—Kenyon & Kenyon LLP

(57) ABSTRACT

A method for rebooting a system having a plurality of execution units in a safe operating mode; after receiving a request signal, the signals delivered by the execution units are compared with one another as a function of a comparison operation to detect a signal deviation.

13 Claims, 2 Drawing Sheets

METHOD FOR REBOOTING A SIGNAL PROCESSING SYSTEM

FIELD OF THE INVENTION

The present invention relates to a method for rebooting a signal processing system having multiple execution units in a safe operating mode.

BACKGROUND INFORMATION

Booting or initializing refers to loading an operating system onto a computer. Booting takes place, for example, after turning on a computer system. In booting a computer, the processor begins at a fixed address to process the BIOS stored in a memory. A test of the connected devices is performed and a search is conducted for boot sectors in a configurable sequence. The first boot sector found is then executed and loads the operating system via a boot loader, usually in multiple steps. The operating system then, if necessary, starts a graphic user interface or a command line interpreter. The operating system is booted, i.e., loaded, by execution of the portion of code in the boot sector which is on a memory medium, e.g., a hard drive. This code is generally referred to as the boot code. The boot code retrieves the actual operating system code. If the operating system does not succeed in booting, it is usually difficult to find the cause of this error. One possible procedure for diagnosing failed booting of the operating system is to boot the computer system from another memory medium, e.g., a floppy disk. In the case of a Windows operating system, if a floppy disk is present in the so-called A drive, the system is prompted to boot from the A drive. If a boot procedure of a system from the hard drive fails, the user may turn the system off and insert a disk into the A drive to attempt to reboot the system. In the case of a Windows 95 operating system, there is the option of ascertaining whether a previous attempt to boot the operating system has failed. If this happens, the Windows 95 operating system boots in a special operating mode often also known as safe operating mode.

In the area of embedded systems, it is customary to perform a number of tests during the initialization phase, i.e., the boot phase, to be sure the computer system is in fact fully functional. For non-safety-relevant systems, e.g., in a PC, it is also customary to perform a test of the required processing units during the boot phase. If an error occurs, the next boot procedure may be performed in safe operating mode. Safe operating mode is particularly robust and is particularly suitable for discovering additional errors. In the case of embedded computer systems, such as those used in an automobile, for example, a particularly robust mode that discovers and tolerates errors is used, e.g., for diagnostic purposes in a repair shop.

The safe operating mode is activated when a sufficiently serious error has occurred and the system should nevertheless function. Errors made safe by the safe operating mode are traditionally configuration errors or software errors.

In traditional computer systems, the initialization phase, i.e., boot phase, runs on a microprocessor having a single-core processor architecture.

Processors having a dual-core or multicore processor architecture are also being used to an increasing extent. Such processors have at least two integrated execution units. Execution units may include a CPU (central processing unit) or a calculating unit such as a floating point unit FPU. As an alternative, execution units may also include a digital signal processor (DSP), a coprocessor, or an arithmetic logic unit ALU.

With traditional computer systems, so far there has not been the option of detecting hardware errors in the execution units during the boot procedure. These errors may result in serious malfunctions of the operating system and then also of the application in embedded computer systems in particular, e.g., in the automotive field.

SUMMARY OF THE INVENTION

Therefore, an object of the present invention is to create a method for booting a computer system having a plurality of execution units so that the occurrence of errors within the execution units will be detected reliably.

The present invention creates a method for rebooting a system having multiple execution units in a safe operating mode, so that after receiving a request signal, the signals delivered by the execution units are compared with one another as a function of a comparison operation to detect a signal deviation.

The request signal is generated on occurrence of a system error or in response to a user request.

In one specific embodiment of the method according to the present invention, an execution unit that is probably defective is detected on the basis of the signal deviations found between the signals delivered by the execution units.

In one specific embodiment of the method according to the present invention, the system error is formed by a hardware error in the system.

In one specific embodiment of the method according to the present invention, the comparison operation to be performed is configured.

In another specific embodiment of the method according to the present invention, an execution unit that has been recognized as being probably defective performs a self-test.

In another specific embodiment of the method according to the present invention, the execution unit that has been recognized as probably defective is deactivated if the self-test reveals that the execution unit is in fact defective.

In a specific embodiment of the method according to the present invention, the safe operating mode is set, i.e., activated, when a system error is detected in a previous boot operation.

In one specific embodiment of the method according to the present invention, the comparison operation performs a majority decision via the signals delivered by the execution units.

In one specific embodiment of the method according to the present invention, a function is calculated to determine the signal deviation as a function of the signals. In one specific embodiment of the method according to the present invention, the execution units are formed by sensors or by identically constructed calculating units.

In one specific embodiment of the method according to the present invention, the calculating unit is formed by a processor, a floating point unit, a digital signal processor, a coprocessor, or an arithmetic logic unit (ALU).

The present invention also creates a signal processing system having a plurality of execution units for generating signals and having a comparison logic which compares the signals generated by the execution units as a function of a comparison operation to detect a signal deviation between the signals when rebooting the signal processing system in safe operating mode after receiving a request signal.

In one specific embodiment of the method according to the present invention, the comparison logic triggers a switching logic which is provided for patching through the signal generated by the execution units as a function of the signal deviation thus detected.

DETAILED DESCRIPTION

Figure 1:
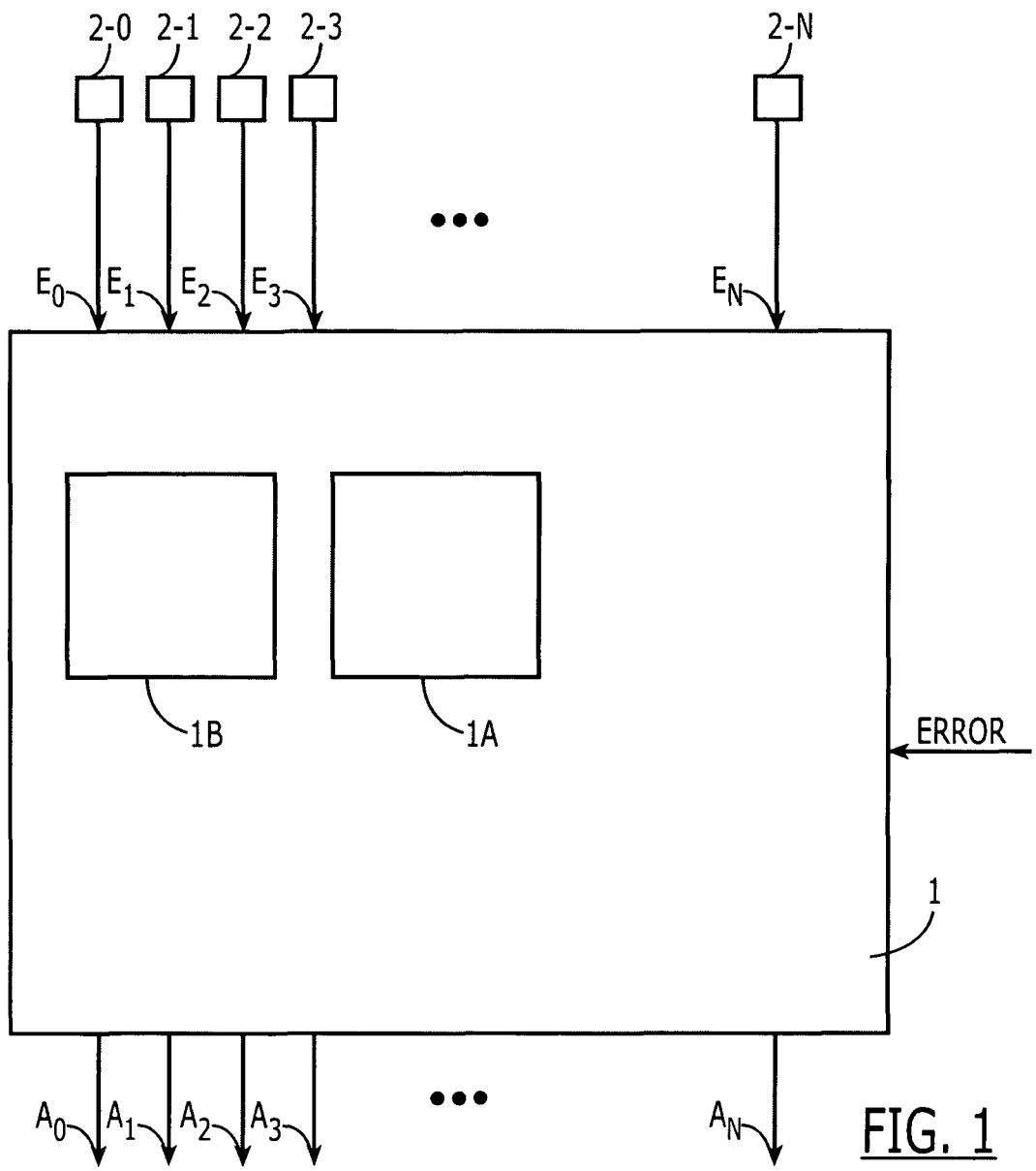
FIG. 1 shows a block diagram to illustrate a specific embodiment of the signal processing system according to the present invention.

As shown in FIG. 1, the input of a switching and comparison circuit 1 is connected at N+1 execution units 2 and receives logic input signals $E_0$, $E_1$, $E_2$, $E_3$, ..., $E_N$ from execution units 2-$i$. Switching and comparison unit 1 includes a comparison logic 1A and a switching logic 1B.

The signal processing system depicted in FIG. 1 may be operated in at least two operating modes. In a first operating mode for enhancing performance, also known as performance operating mode, execution units 1-$i$, i.e., cores, process different programs, i.e., tasks, in parallel. Execution units 1-$i$ may be any execution units 2-$i$ for executing a computation instruction, e.g., a processor, a floating point unit FPU, a digital signal processor DSP, a coprocessor, or an arithmetic logic unit ALU. Programs may be processed by various execution units 2-$i$ in performance operating mode PM synchronously or asynchronously. In the performance mode, there is no redundant processing, but instead execution units 2-$i$ perform various calculations and/or programs in parallel. In strict performance operating mode, all input signals $E_i$ are switched, i.e., directed, to corresponding output signals $A_i$.

In addition to using a high-performance computation system, the second reason for a multicore architecture is to increase the reliability of signal processing by having multiple execution units 2 process the same program redundantly. In this second operating mode, also known as safe mode, i.e., comparison mode VM, the results, i.e., logic output signals of the execution units, are compared with one another by switching and comparison circuit 1, so that an error and/or a signal deviation that has occurred may be detected by comparison for agreement. In strict comparison mode VM, all input signals $E_i$ are therefore directed to, i.e., mapped to, exactly one single output signal $A_j$. Mixed forms are possible. Configurable switching logic 1B contains the information about how many output terminals, i.e., output signals $A_j$, are provided. In addition, switching logic 1B contains information about which input signals $E_i$ contribute to which output signals $A_j$. A mapping function assigning input signals $E_i$ to different output signals $A_j$ is thus stored in switching logic 1B.

For each output signal $A_j$, processing logic 1A determines in which form the input signals contribute to the particular output signal. For example, output signal $A_0$ is generated by input signals $E_1$, ..., $E_N$. For m=1, this corresponds to simply patching through one input signal. For m=2, two input signals $E_1$, $E_2$ are compared. This comparison may be performed synchronously or asynchronously by circuit 1. The comparison may be performed bit-by-bit or, alternatively, only significant bits are compared with one another. At m≧3 there are various possibilities. In a first possibility, all signals are compared and if there are at least two different values, an error is detected and optionally signaled by switching and comparison circuit 1. Another possibility is for a K-out-of-m selection to be performed, where K>m/2. In one specific embodiment, this is implemented by providing comparators. A first error signal is optionally generated when one of the input signals is recognized as deviating from the other input signals. When there is a second error signal different from the first error signal, all three input signals may differ from one another. In another specific embodiment, the input signal values are sent to another calculating unit which computes a mean or median value, for example, and/or performs an error-tolerant algorithm FTA. In an error-tolerant algorithm, the extreme values of the input signal values are deleted, i.e., ignored, and the remaining signal values are averaged. In one specific embodiment, averaging is performed over the entire set of the remaining signal values. In one alternative specific embodiment, averaging is performed over a subset of the remaining signal values that is easily formed in the hardware. While in averaging, only one addition and one division need be performed, FTM, FTA, or the formation of a median value may require sorting of the input signal values. In one specific embodiment, an error signal is optionally output, i.e., displayed, if the signal deviations, i.e., extreme values, are large enough.

The various signal processing options mentioned for forming one signal represent comparison operations. Processing logic 1A defines the precise design of the comparison operation to be performed for each output signal. A and thus also for the input signals $E_i$. The combination of information within switching logic 1B, i.e., the assignment function of the comparison operation indicated in processing logic 1A per output signal, i.e., per function value, constitutes operating mode information and defines the operating mode. This information usually has multiple values and is represented by more than one logic bit. For the case when only two execution units 2-$i$ are provided and thus there is only one comparison mode, all the information may be condensed into a single logic bit in the operating mode.

The system is generally switched from a performance operating mode PM to a comparison mode VM by the fact that execution units 2-$i$ which are mapped, i.e., patched through, to different signal outputs in performance operating mode PM, are mapped, i.e., patched through, to the same signal output in comparison mode VM. This is preferably implemented by providing a subset of execution units 2-$i$ in which all inputs $E_i$ which are to be taken into account in the subset are switched directly to corresponding output signals $A_i$ in performance operating mode PM, while in comparison operating mode VM the input signals are all mapped, i.e., patched through, to a single signal output. Alternatively, switching may also be implemented by changing the pairings.

It is possible to switch dynamically between the different operating modes during ongoing operation, controlled by the software. In one specific embodiment, switching is triggered by the execution of special switching commands, i.e., switching instructions, special instruction sequences, explicitly characterized instructions, or by access to certain addresses by at least one of execution units 2-$i$ of the signal processing system.

Switching between comparison operating mode VM, in which redundant processing and checking are performed, and performance operating mode PM, in which performance is enhanced by separate program processing, is performed by switching unit 1. In one specific embodiment, for the purpose of switching, the programs, application programs, program parts, or program commands are characterized by an identifier, which makes it possible to detect whether these program commands must be processed in comparison operating mode VM or whether they may be made accessible to performance operating mode PM. The characterization may take place via one bit in the program command. Alternatively, the subsequent sequence may be characterized by a special program command.

In comparison operating mode VM, or safe mode, the computation of the results, i.e., output signals, of execution units 2-$i$, takes place for equal lengths of time in synchronous processing on the different execution units. The results are then available to switching unit 1 in synchronous processing practically simultaneously in safe operating mode VM. If the results match, the corresponding data are enabled. If there is a signal deviation, there is a predetermined error response.

If the signal processing system is in the performance operating mode, the programs are processed in parallel and comparators, i.e., comparisons, are not triggered within switching and comparison circuit 1.

In the method according to the present invention, a boot operation is performed in safe mode on the system level during which the hardware of the signal processing system according to the present invention is operated in the comparison mode during the startup phase. For example, if there is a crash, i.e., a fatal error during an initial boot operation, then in one possible specific embodiment a display flag that indicates a successful boot operation is not set. In a subsequent system reboot procedure, switching and comparison circuit 1 recognizes the system error that occurred previously. After detecting the fatal error, then in the next boot operation or in an additional boot operation initiated via an external diagnostic signal, the system is booted in a safe operating mode. After the system error has occurred, signals $E_i$ delivered by various execution units 2-$i$ are compared as a function of a comparison operation to detect a signal deviation. In one possible specific embodiment, an execution unit 2 that is probably defective is recognized as such on the basis of a signal deviation found between the signals emitted by execution units 2-$i$. In one possible specific embodiment, the comparison operation to be performed is configurable. In an alternative specific embodiment, the comparison operation to be performed is hardwired.

In one specific embodiment of the method according to the present invention, an execution unit 2 that has been identified as defective is prompted by a corresponding command to perform a self-test. This self-test may be performed by a hardware built-in self-test structure (HW-BIST) or by a software built-in self-test (SW-BIST). If the self-test as performed reveals that execution unit 2 is in fact defective, it is then preferably deactivated.

Figure 2:
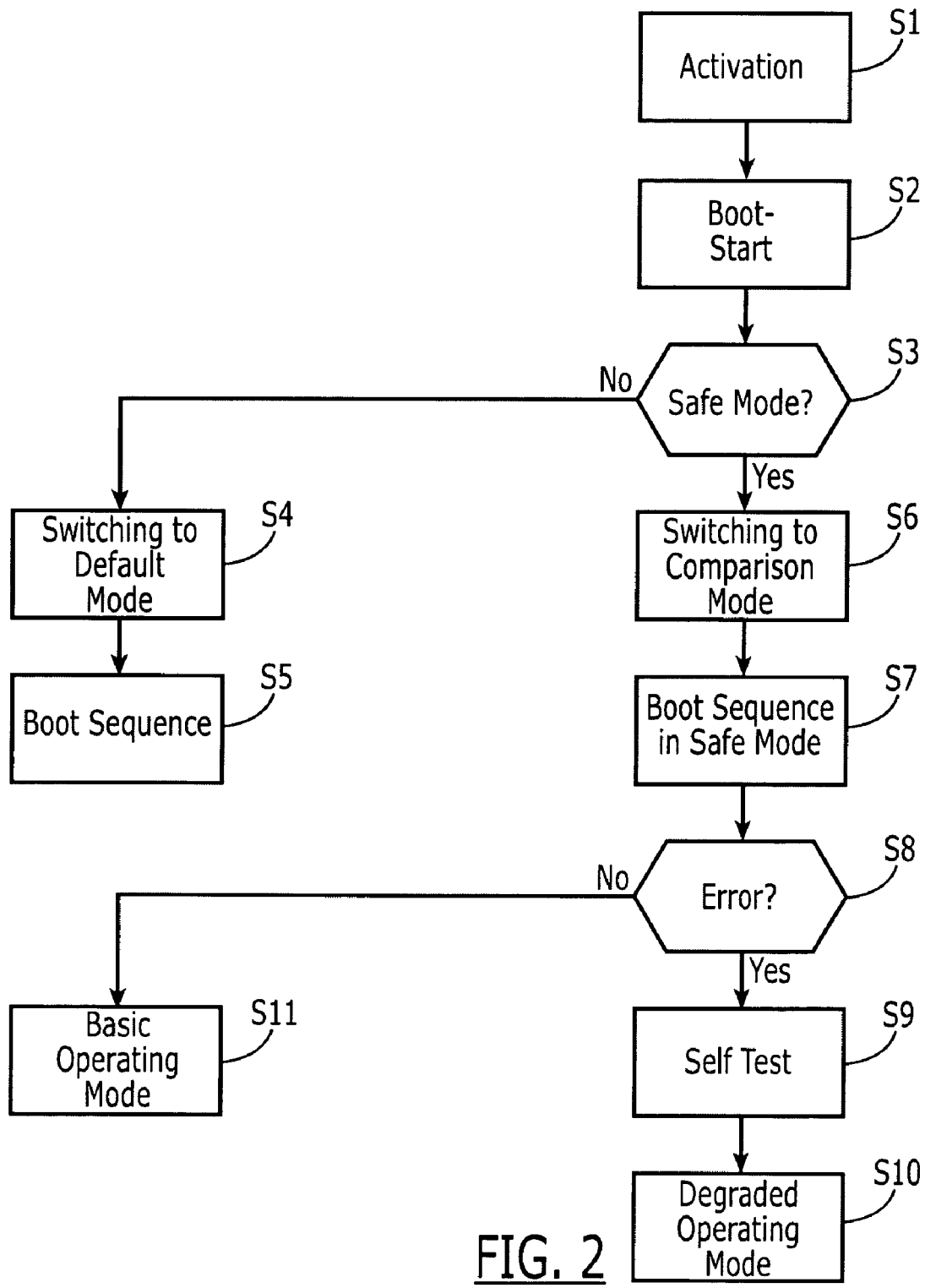
FIG. 2 shows a flow chart to illustrate one possible specific embodiment of the method according to the present invention.

FIG. 2 shows a flow chart of one possible specific embodiment of the method according to the present invention for rebooting a system having a plurality of execution units 2 in a safe operating mode.

In one step S1, the system is activated, e.g., by a power-on command or by a reset.

Then a boot sequence is started in a step S2.

Another step S3 checks on whether there is a reason for performing a system start in a safe operating mode. This may be detected for example by an external signal from a diagnostic device in a repair shop. As an alternative, the logic value of a bit and/or flag set in a previous boot operation may also be checked. Another possibility is for an external module, e.g., an ASIC or a system error memory, to send the message that there is a reason to perform a startup operation in a safe operating mode. Another possibility is that a user may request and signal a new boot operation in a safe operating mode.

If there is no need to perform booting in safe operating mode, then in step S4 the system hardware is set in a default operating mode via switching and comparative circuit 1, the default mode usually being a high-performance mode.

The boot sequence is then processed in the default operating mode in step S5.

Conversely, if it is found in step S3 that there is a reason for booting in safe operating mode, then in step S6 a comparison mode is set via switching and comparison circuit 1.

In step S7 the system is then booted in the safe operating mode. Although the comparison mode set in step S6 is performed at the platform level, the safe operating mode in step S7 is performed at the user level.

On detection of an error on the platform level and/or on the hardware level in step S8, the error signal which is signaled outward, if necessary, during normal operation, is first encapsulated. For error localization, a signal processing system having two execution units 2 switches from the comparison mode that has been set to the performance mode, in which mode two execution units 2 may be operated independently of one another. Next in step S9 an additional error recognition mechanism, e.g., a self-test, is started on at least one of the two execution units 2. This self-test may be performed, for example, by a built-in hardware self-test structure or by using a software-based self-test. If an error is detected by the self-test, then error localization may be performed in the system. If an error is localized, corresponding execution unit 2 is preferably deactivated and the system is then operated further in a degraded operating mode in step S10.

Conversely, if no error and/or hardware error is/are detected in step S8, the system is switched to a basic operating mode in step S11.

In one possible specific embodiment of the signal processing system according to the present invention, at least three execution units 2 are connected to switching and comparison circuit 1, as depicted in FIG. 1. A majority voting, i.e., a majority decision, is preferably implemented in the comparison mode. The signals originating from three execution units 2 are compared and the majority signal is relayed further, i.e., patched through, as the valid signal. For example, if two signals are identical while the third signal deviates from the two others, then the identical signal is patched through for further signal processing. In this case, even an error processing that goes beyond error recognition may be implemented so that the availability of the signal processing system is increased due to this particularly robust configuration. In this configuration, the comparator may be used for identification of defective execution unit 2 in step S9.

After the boot procedure depicted in FIG. 2, the signal processing system finally switches to a basic operating mode in which the detectable errors are identified and also handled as much as possible. In this basic operating state, it is then also possible to operate further despite the existence of errors that have occurred.

Using the method according to the present invention it is possible to use the presence of a switching and comparison circuit 1 in an initialization or boot procedure and thus avoid errors that have occurred in a multicore system architecture. Using the method according to the present invention in the area of personal computers, for example, booting in safe mode may be improved. In another application field, e.g., in embedded systems, in particular in a repair shop diagnosis for an automobile, an error may be discovered by using the method according to the present invention and the operating mode may be activated, in which case a so-called limp home operating mode may be made available after an emergency start. With the method according to the present invention, the robustness, i.e., error detection, i.e., error tolerance achievable by using a safe operating mode, may be extended to include errors and defects, in particular hardware defects of the execution units. The method according to the present invention makes it possible to achieve a much greater availability of the signal processing system.

What is claimed is:

1. A method for rebooting a system having at least three execution units in a safe operating mode, comprising:
   after receiving a request signal, comparing signals issued by the at least three execution units with one another as a function of a comparison operation to detect a signal deviation, wherein the comparison operation performs a majority decision by using the signals issued by the at least three execution units; and
   detecting an execution unit that is probably defective on the basis of the detected signal deviation among the signals issued by the at least three execution units.

2. The method according to claim 1, further comprising forming a system error by a hardware defect in the system.

3. The method according to claim 1, wherein the comparison operation to be performed is configured.

4. The method according to claim 1, wherein an execution unit that is recognized as probably being defective performs a self-test.

5. The method according to claim 4, further comprising deactivating the execution unit that is recognized as probably being defective if the self-test reveals that the execution unit is in fact defective.

6. The method according to claim 1, further comprising setting the safe operating mode if a system error is detected in a previous boot operation.

7. The method according to claim 1, further comprising calculating a function for detecting the signal deviation on the basis of the signals.

8. The method according to claim 1, wherein the execution units are formed by identically constructed calculating units or by sensors.

9. The method according to claim 8, wherein the calculating units include at least one of a CPU, a floating point unit, a digital signal processor DSP, a coprocessor, and an arithmetic logic unit ALU.

10. The method according to claim 1, further comprising generating the request signal after occurrence of a system error.

11. The method according to claim 1, wherein the request signal is entered by a user.

12. A signal processing system, comprising:
    at least three execution units for generating signals; and
    a comparison logic for comparing, after receiving a request signal, signals generated by the at least three execution units with one another as a function of a comparison operation to detect a signal deviation among the signals generated by the execution units in rebooting the signal processing system in a safe operating mode, wherein the comparison operation performs a majority decision by using the signals generated by the at least three execution units, and wherein an execution unit that is probably defective is detected on the basis of the detected signal deviation among the signals generated by the at least three execution units.

13. The signal processing system according to claim 12, further comprising a switching logic, and wherein the comparison logic triggers the switching logic for patching through the signals generated by the execution units as a function of the signal deviation detected.

* * * * *